May 6, 1952     W. R. GOEHNER     2,595,670
REFLECTING SURFACE BONDED TO A FILM
Filed Feb. 11, 1949
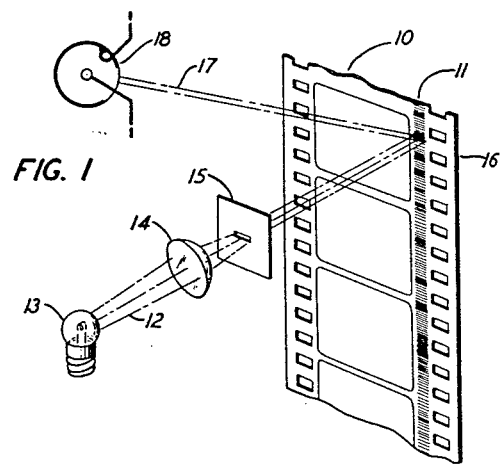
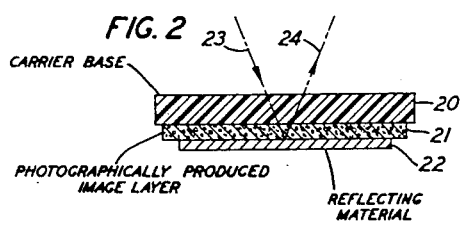
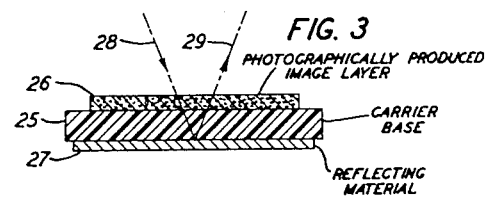
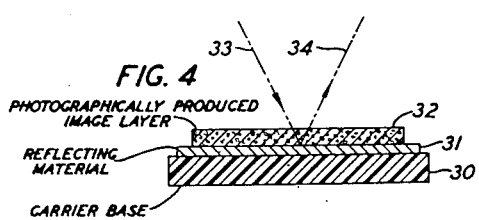
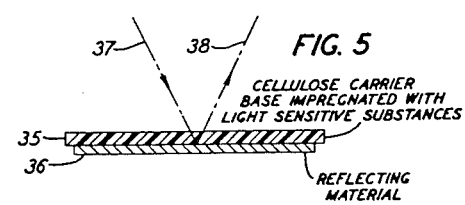
INVENTOR
W. R. GOEHNER
BY
G. H. Heydt.
ATTORNEY Patented May 6, 1952

2,595,670

UNITED STATES PATENT OFFICE 2,595,670

REFLECTING SURFACE BONDED TO A FILM

William R. Goehner, Harding Township, Morris County, N. J., assignor to Bell Telephone Laboratories, Incorporated, New York, N. Y., a corporation of New York Application February 11, 1949, Serial No. 75,890

11 Claims. (Cl. 179—100.3)

This invention relates to a product which comprises a reflecting surface bonded to a film, and also particularly to the reproduction of sound from film records made in accordance with the invention.

It is an object of the invention to obtain an improved film product that is suitable for use with light beam scanning systems.

It is another object of the invention to obtain an optical system by which a record may be scanned continuously, and in which the signal-to-noise ratio is improved materially.

It is a further object of the invention to obtain an improved device for the reproduction of sound waves by use of photographic film, and by light reflection in combination with a light sensitive device.

It is a still further object of the invention to obtain an improved method of reproducing sound waves from a photogram record by redirecting light through a record so as to cause the light to impinge upon a light sensitive device.

Further objects of the invention will appear from the following description when read in conjunction with the accompanying drawings.

In certain types of sound on film reproducers which can be used for repetitive announcements, such as "time of day" informations, it is desirable to use a reflection reproducing optical system. Some systems, for example that shown in Reissue Patent 21,111, issued June 11, 1939, to J. L. Franklin, use a highly polished drum on which a sound film is mounted. A scanning light beam is directed through the sound film towards the drum and is reflected back through the film upon a photoelectric cell, by the reflective action of the polished drum.

While the reflection reproducing type optical systems have advantages, as compared to a transmission system in which the light beam is directed through a film so as to impinge directly upon a photoelectric cell, it is also true that certain operational disadvantages result from use of these systems. Due to the difficulty of obtaining a perfect optical surface on the reflecting surface, extraneous and background noises will occur in these systems. These noises are occasioned by minute imperfections in the reflecting surface and are extremely difficult to control effectively. Since the illuminated area is finite, the same imperfections in the optical surface will initiate disturbances with cyclic regularity during the sound reproduction process. When a separate metal base reflector is utilized, it is very difficult to produce a truly efficient reflector surface on the metal base so as to have a resultant optical surface free from microscopic optical defects. These types of defects are tolerable for general commercial purposes, as when utilized in automobile headlights wherein the entire surface of the reflector is in instant use for transmitting light, but when used in precision systems where good image quality is required, these minute imperfections in the optical system are found to be objectionable. When a sound film is mounted on a separate metal reflector and scanned with a very narrow light beam of approximately 0.002 inch, the imperfections in the reflector pass across the scanning beam and intercept and/or deflect a percentage of the beam, and generate a background noise which exceeds the usual film noise.

Another disadvantage of these systems is that the air spaces which exist between the record films and the reflecting surfaces tend to displace the reflected light beams, for the sound film may be mechanically distorted so that the contacting surface is not in full effective contact with the reflector surface. This loss of effective contact will cause additional deviation of the reflected light beam and result in additional scanning losses. Also it is very difficult to prevent the collection of dirt and oil film upon the reflector surface.

The deviations of the reflected light beam caused by those unwanted conditions increases the scanning loss, and can produce undesirable modulations of the record signal. Their occurrence results in reduced intelligibility of the original sounds, disturbing effects in the pauses between syllables and words, and in general, inefficient reproduction quality. The manufacture of a suitable reflecting surface is also a costly procedure.

To overcome the disadvantages which appear to be inherent to reflection reproducing optical systems, it was discovered that bonding a reflecting surface directly to a film eliminates the unwanted noises. When this method is utilized the film is identical with the reflecting surface, and consequently it will not generate unwanted background noises for the optical deviations of the scanning light beam will be minor. This method has an additional advantage of being a comparatively inexpensive process.

In accordance with the invention a reflecting material is bonded to a carrier base and a photographic emulsion composition is bonded to the reflecting material. Or, the reflecting material is bonded to the photographic emulsion composition which is bonded to the carrier base. Or, the reflecting material and the emulsion composition are bonded to the carrier base on opposite sides thereof. Or, a reflecting material is bonded to a transparent cellulose base type of film which is impregnated with a solution of light sensitive substances.

Fig. 1 is a schematic drawing of a film, which includes a sound track in accordance with the invention, and shows a light beam directed upon a portion of the sound track and reflected upon a light sensitive device;

Fig. 2 is a side-view schematic drawing of a section of film in accordance with the invention, and shows a carrier base with a photographically produced image layer bonded thereto, and a reflecting material bonded to a surface of the photographically sensitive material;

Fig. 3 is a side-view schematic drawing of a section of film in accordance with the invention, and shows a carrier base with a photographically produced image layer and a reflecting material bonded to opposite side thereof;

Fig. 4 is a side-view schematic drawing of a section of film in accordance with the invention, and shows a reflecting material bonded to a carrier base, and a photographically produced image layer bonded to a surface of the reflecting material; and Fig. 5 is a schematic drawing of a film section comprising a cellulose base impregnated with a solution of light sensitive substances and having a reflecting material bonded thereto.

Referring to Fig. 1 which is a schematic drawing of a system in accordance with the invention. Fig. 1 shows a section of exposed and developed motion picture film 10 which includes a sound track 11. A beam of incident light 12 from a light source 13 is directed through a lens 14 and a focussing slit 15, upon a predetermined area of the sound track 11. The beam 12 is reflected by a reflecting surface 16 which is bonded to the sound track portion 11 of the film 10. The reflected beam 17 is modulated by sound symbols on the sound track 11, and thereafter the reflected beam 17 impinges upon a light sensitive device 18. The light sensitive device 18 modulates an electric current in accordance with the sound symbol modulations which were applied to the reflected beam 17. The film 10 and/or the sound track portion 11 can be constructed in accordance with the invention as shall be explained.

The reflecting material 16 can be composed of any suitable material which has high reflecting power in the spectral range wherein the light sensitive device 18 has maximum sensitivity. A reflecting material of aluminum, nickel, rhodium, silver, gold or platinum can be used, and will produce a satisfactory reflecting optical surface.

The reflecting surface material can be applied to a film by any suitable method such as the conventional evaporation process which is described on page 171 of "Procedures in Experimental Physics" by John Strong, and published by Prentice-Hall Incorporated of New York in 1945. Or, the well-known Brashear method of constructing optical surfaces can be utilized. The Brashear construction method is described on page 154 of Strong's book.

It will be understood also that the carrier base should be as clear as is practical in order to transmit the scanning light with minimum transmission loss.

Referring to Fig. 2 which is a schematic drawing of an embodiment of the invention. Fig. 2 shows a sectional view of an exposed and developed film section comprising a carrier base 20, a photographically produced image layer 21 is bonded to the carrier base 20, and a reflecting material 22 is bonded to a surface of the photographic material 21.

In the particular embodiment of the invention shown in Fig. 2, an incident light beam 23 is focussed upon the film. The incident beam 23 penetrates the carrier base 20 and the photographically produced image layer 21, and impinges upon the surface of the reflecting material 22 as shown. The reflecting material reflects the incident light beam 23. The reflected beam 24 passes a second time through the photographic material 21 and is modulated by signal symbols thereon, and then passes through the carrier base 20 and impinges upon whatever light sensitive device is used in the system.

Referring to Fig. 3 which is a sectional view schematic drawing of an embodiment of the invention. Fig. 3 shows an exposed and developed film section comprising a carrier base 25, with a photographically produced image layer 26, and a reflecting material 27 bonded to opposite surfaces of the carrier base 25. A scanning light beam 28 is focussed on the film. The beam 28 passes through the photographic material 26 and through the carrier base 25, and impinges upon the surface of the reflecting material 27. The reflecting material 27 reflects the beam of incident light. The reflected beam 29 passes from the reflecting material 27, through the carrier base 25 and the photographic material 26. The reflected beam 29 is modulated by signal symbols on the photographic material 26.

A possible disadvantage might result from use of the embodiment of Fig. 3. Since the conventional carrier base 25 is approximately 0.006 inch in thickness, the reflected light beam 29 may be displaced 0.012 inch along the surface of the photographically sensitive material 26 with resultant incorrect modulations from signal symbols thereon, for an incident light angle of 45 degrees. For a 14 inch per second film speed this deviation is equivalent to 180 degree phase difference at 530 cycles. However, if a very thin carrier base film is utilized, such as a transparent cellulose base, this particular embodiment of the invention will be found to be both practical and efficient.

It will be appreciated that the example using a 45-degree angle is extreme, but is chosen for purposes of illustration.

Referring to Fig. 4, there is shown a sectional view of an embodiment of the invention. Fig. 4 shows an exposed and developed film section comprising a carrier base 30, a reflecting material 31 bonded to a surface of the carrier base 30, and a photographically produced image layer 32 bonded to a surface of the reflecting material 31.

In the particular embodiment of the invention shown in Fig. 4, an incident light beam 33 is focussed upon the film. The beam 33 penetrates the photographically produced image layer 32 and impinges upon a surface of the reflecting material 31. The reflecting material 31 reflects the incident light beam 33. The reflected beam 34 passes a second time through the photographic material 32, and is modulated by signal symbols thereon, and then impinges upon whatever light sensitive device that is utilized in the system. The scanning light beam passes only through the photographic material 32, which usually averages but 0.0005 inch in depth, and since the reflecting material 31 is in intimate contact with the photographic material 32 it is apparent that the optical deviation of the reflected light beam 34 will be minor.

Referring to Fig. 5 which is a schematic drawing of an exposed and developed film section which comprises a cellulose base 35. The cellulose base 35 is impregnated with a solution of light sensitive substances, and has a reflecting material 36 bonded thereto. After development of the exposed light sensitive impregnated cellulose layer, a beam of incident light 37 is directed upon the film and penetrates the cellulose base 35, and is reflected by the reflecting material 36. The reflected beam 38 is modulated by signal symbols formed by the exposure and development of the film, and contained within the cellulose base 35. The modulated reflected beam 38 can be utilized to actuate a light sensitive device used in the system. Since films of the cellulose type are very thin, and also being substantially without grain structure are homogenous, they generate a low inherent noise. Since the reflecting material 36 is bonded to the film 35 no unwanted background noises will be generated, and the reproduction quality will be satisfactory.

In the interest of clarity the drawings of Figs. 2, 3, 4 and 5 are not to scale. The thickness of a conventional carrier base is usually 0.006 inch, while the thickness of photographically sensitive material is usually 0.0005 inch. The reflecting material can be of any suitable thickness. A reflecting material 0.00002 inch thick has been found satisfactory.

It is to be understood that the above-described embodiments are illustrative examples, and that various modifications may be made without departing from the spirit of the invention.

What is claimed is:

1. A photographic film comprising a carrier base, a coating of photographically sensitive material and a reflecting material laterally bonded together.

2. An exposed and developed photographic film comprising a photographically produced image layer, a reflecting material, a carrier base, said photographically produced image layer and said reflecting material bonded to said carrier base on opposite surfaces thereof.

3. A photographic film comprising a carrier base, a reflecting material bonded to said carrier base, and a photographically produced image layer bonded to said reflecting material.

4. A photographic film comprising a carrier, a photographically sensitive material bonded to said carrier base, and a reflecting material bonded to said photographically sensitive material.

5. A photographic film of transparent cellulose carrier base, impregnated with a solution of light sensitive substance, and having a reflecting material bonded thereto.

6. In a photographic apparatus in which a sound record is formed on a transparent carrier base the combination of a film having a reflecting material bonded thereto, means for directing light through said film onto said reflecting material, and a light sensitive device positioned to receive said reflected light.

7. In a sound film reproducing system a sound track comprising a carrier base, a photographically produced image layer and a reflecting material, said photographically produced image layer and said reflecting material bonded to said carrier base on opposite sides thereof, a light sensitive device responsive to variations of light flux, an optical system for directing a beam of light to pass through said photographically produced image layer and carrier base and impinge upon said reflecting material in an area of said sound track, whereby said beam is reflected by said reflecting material upon said light sensitive device.

8. In a sound film reproducing system, means for scanning a continuously varying sound track occupying a longitudinal portion of a sound film, said means comprising a light source, an optical system for directing a beam of light from said source to pass through an area of said track, a reflecting material bonded to said film to reflect said beam back through an equal area of said track, a light sensitive device to receive said returned reflected beam, said light sensitive device being responsive to variations of light flux.

9. In a sound film reproducing system the combination of an exposed and developed film comprising frames of recorded pictures and a sound track, and a reflecting material bonded to said sound track.

10. In a sound film reproducing system the combination of an exposed and developed film comprising frames of recorded pictures and a sound track, a coating of reflecting material deposited upon said film in the area of said sound track, a device sensitive to variations of light flux, a light source, an optical system for directing a beam of light from said source to pass through a portion of said track, whereby said beam is reflected back through said track upon said light sensitive device.

11. A photographic film comprising a carrier base, a coating of photographically sensitive material and a reflecting material, said base and materials being bonded together and said sensitive material being suitable for recording sound photographically.

WILLIAM R. GOEHNER.

REFERENCES CITED

The following references are of record in the file of this patent:

UNITED STATES PATENTS

| Number | Name | Date |
|---|---|---|
| 1,679,708 | Bullis | Aug. 7, 1928 |
| 1,843,708 | Czeija et al. | Feb. 2, 1932 |
| 2,039,436 | Moore | May 5, 1936 |

FOREIGN PATENTS

| Number | Country | Date |
|---|---|---|
| 309,659 | Great Britain | Apr. 18, 1929 |